United States Patent
Esjunin

(10) Patent No.: US 11,542,202 B2
(45) Date of Patent: Jan. 3, 2023

(54) REFRACTORY ARTICLE

(71) Applicant: SAINT-GOBAIN CERAMICS & PLASTICS, INC., Worcester, MA (US)

(72) Inventor: Evgeniy E. Esjunin, Dunstable, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 16/693,188

(22) Filed: Nov. 22, 2019

(65) Prior Publication Data

US 2020/0172442 A1 Jun. 4, 2020

Related U.S. Application Data

(60) Provisional application No. 62/772,952, filed on Nov. 29, 2018.

(51) Int. Cl.
*C04B 35/565* (2006.01)
*F27D 5/00* (2006.01)

(52) U.S. Cl.
CPC .......... *C04B 35/565* (2013.01); *F27D 5/0006* (2013.01); *C04B 2235/383* (2013.01); *C04B 2235/945* (2013.01)

(58) Field of Classification Search
CPC ............ C04B 35/565; C04B 2235/383; C04B 2235/945; F27D 5/006
USPC ....................................................... 428/698
See application file for complete search history.

(56) References Cited

U.S. PATENT DOCUMENTS

| 4,462,798 | A | | 7/1984 | Foster | |
|---|---|---|---|---|---|
| 5,332,200 | A | * | 7/1994 | Gorin | F27B 14/061 266/280 |
| 5,595,460 | A | | 1/1997 | Miller et al. | |
| 5,836,760 | A | | 11/1998 | Turner et al. | |
| 2005/0252145 | A1 | * | 11/2005 | MacDonald | E04C 1/395 52/606 |
| 2006/0242914 | A1 | * | 11/2006 | Stephansky | F27D 1/0006 52/27 |
| 2015/0159955 | A1 | | 6/2015 | Morelock | |

(Continued)

FOREIGN PATENT DOCUMENTS

| CN | 201327298 Y | 10/2009 |
|---|---|---|
| CN | 205403495 U | 7/2016 |

(Continued)

OTHER PUBLICATIONS

International Search Report and Written Opinion dated Mar. 20, 2020 in International Application No. PCT/US2019/062876, 13 pp.

(Continued)

*Primary Examiner* — Humera N. Sheikh
*Assistant Examiner* — Katherine A Christy
(74) *Attorney, Agent, or Firm* — Abel Schillinger, LLP; Adrian Lawrence

(57) ABSTRACT

A refractory article including a body having central opening extending through at least a portion of the body, the central opening having a receiving surface having a convex curvature. In an embodiment, the body can include a coupling protrusion extending from a portion of an upper surface of the body and a coupling depression on a portion of a bottom surface of the body.

18 Claims, 6 Drawing Sheets

(56) References Cited

U.S. PATENT DOCUMENTS

2015/0232959 A1    8/2015   Walters et al.
2018/0313539 A1   11/2018   Russell et al.

FOREIGN PATENT DOCUMENTS

| CN | 205482359 U | 8/2016 |
| CN | 205893308 U | 1/2017 |
| EP | 0764229 A1 | 3/1997 |
| JP | S54071245 U | 5/1979 |
| JP | H04046700 U | 4/1992 |
| JP | 2004067484 A | 3/2004 |
| KR | 1020140034111 A | 3/2014 |
| KR | 1020150079145 A | 7/2015 |

OTHER PUBLICATIONS

Extended European Search Report for EP19889225.9, dated Oct. 6, 2022, 14 pages.
Sung Hyun-Woo et al: Novel process for recrystallized silicon carbide through [beta]-[alpha] phase transformation, Ceramics International; Elsevier; vol. 46, No. 14, abstract only.

* cited by examiner

REFRACTORY ARTICLE

CROSS-REFERENCE TO RELATED APPLICATION(S)

This application claims priority under 35 U.S.C. § 119(e) to U.S. Patent Application No. 62/772,952 entitled "REFRACTORY ARTICLE," by Evgeniy E. ESJUNIN, filed Nov. 29, 2018, which is assigned to the current assignee hereof and incorporated herein by reference in its entirety.

FIELD OF THE DISCLOSURE

The present disclosure relates to refractory articles.

RELATED ART

Ceramic processing can be an involved and time consuming task, including sourcing and combining the proper components together into an initial mixture and use of one or more forming processes, such as casting, molding, pressing, spraying, and the like to give the initial mixture shape. The initial shaped body is generally referred to as a green (i.e., unfinished) body. To transform the green body into a ceramic body, generally one or more controlled heating processes can be used to give the body the desired composition and/or microstructure. Typically, such heating processes may use considerably high temperatures, such as on the order of 700° C. and higher. Moreover, such heating processes can last for hours or even days.

Refractory articles, such as kiln furniture can be used to properly support a green body during the heating process. The industry continues to demand improvements in kiln furniture.

BRIEF DESCRIPTION OF THE DRAWINGS

Embodiments are illustrated by way of example and are not limited in the accompanying figures.

DETAILED DESCRIPTION

Figure 1:
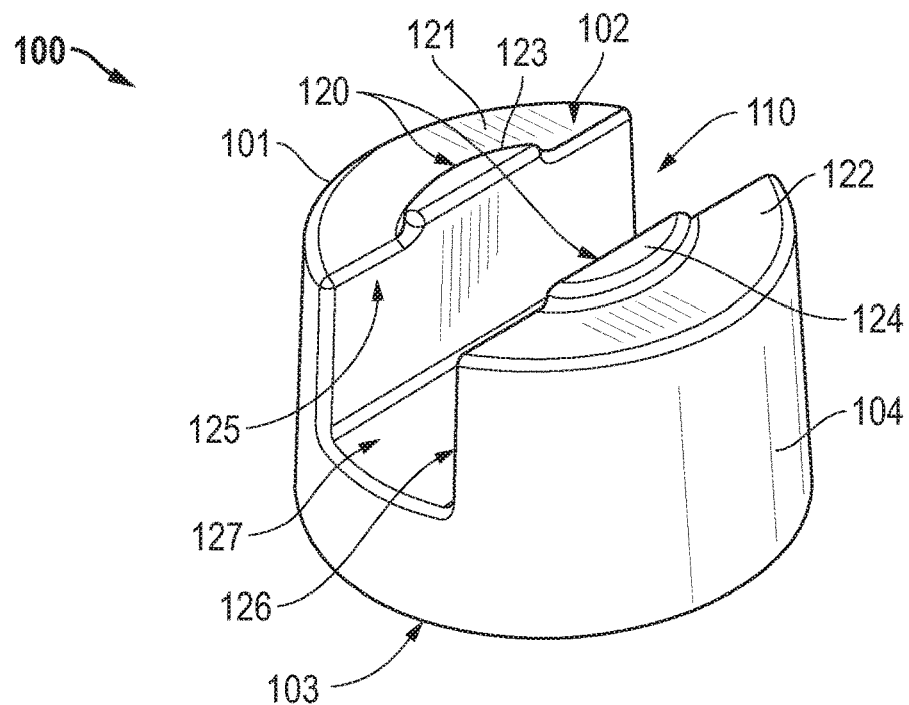
FIG. 1 includes a perspective view illustration of a refractory article in accordance with an embodiment.

The following description in combination with the figures is provided to assist in understanding the teachings disclosed herein. The following discussion will focus on specific implementations and embodiments of the teachings. Other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all other technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the refractory arts.

The following embodiments are generally directed to a refractory article. Exemplary refractory articles can include, but are not limited to various types of kiln furniture designed to support products in a high-temperature environment.

The refractory articles of the embodiments herein may be formed through a variety of suitable methods, including but not limited to, mixing, molding, casting (e.g., slip casting or drain casting), pressing, drying, cooling, firing, or any combination thereof. In accordance with an embodiment, the process of forming the refractory article may include forming a mixture including raw material components, which are then formed into a green body. As used herein, "green body" refers to a body that will undergo one or more processing steps prior to formation of the finally-formed refractory article. After forming the green body, the process may further include firing the green body in a high temperature environment to change the green body into the finally-formed refractory article.

Figure 2:
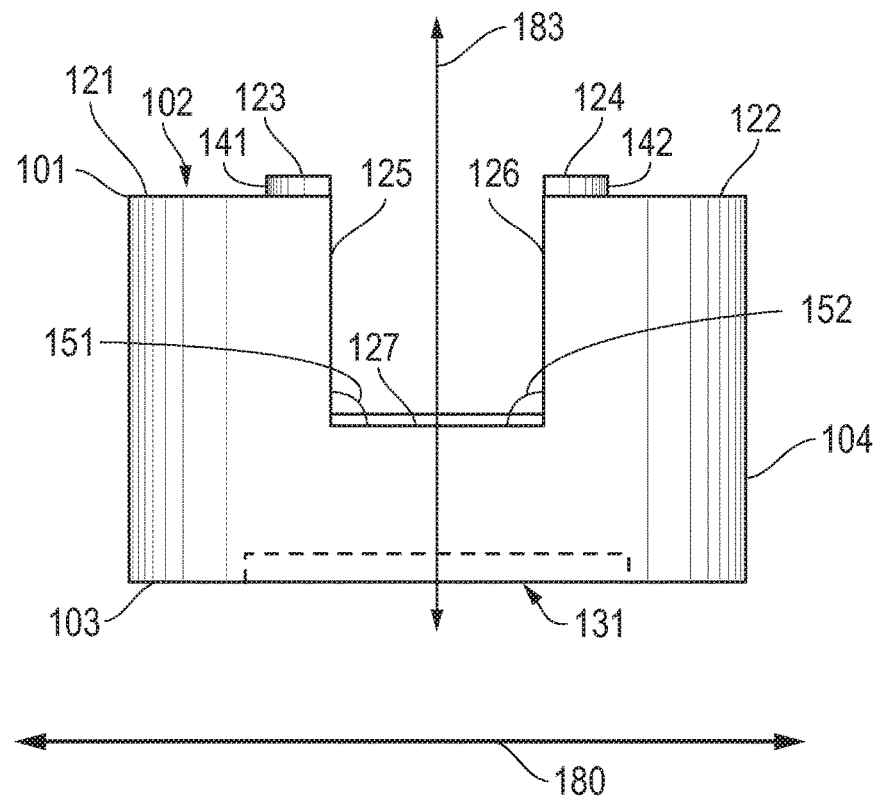
FIG. 2 includes a side-view illustration of a refractory article in accordance with an embodiment.
Figure 3:
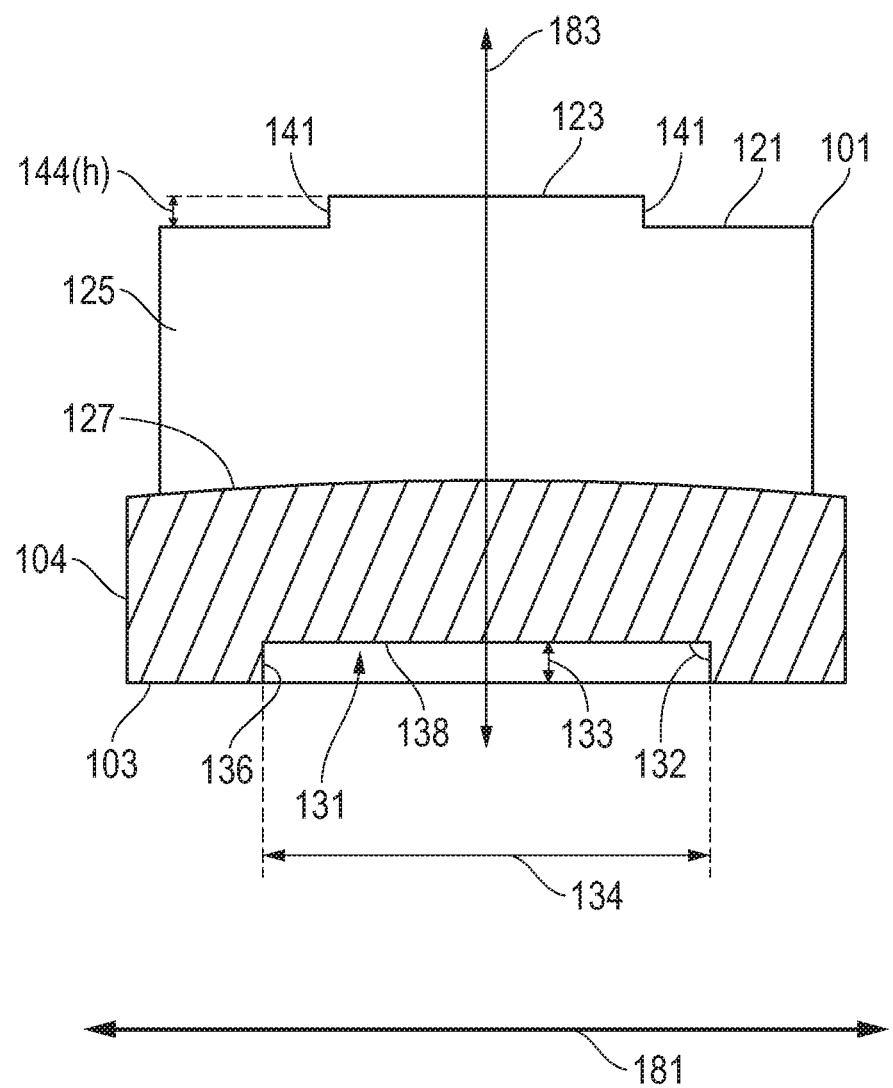
FIG. 3 includes a cross-sectional view of a portion of a refractory article in accordance with an embodiment.

Referring now to the refractory article of FIGS. 1-3, the refractory article 100 can have a body 101, including an upper surface 102, a bottom surface 103, and a side surface 104, wherein the side surface 104 extends between the upper surface 102 and bottom surface 103. The body 101 may further include a central opening 110 defined by a first inner side surface 125, a second inner side surface 126, and a receiving surface 127 extending between the first inner side surface 125 and second inner side surface 126. It will be appreciated that while the central opening 110 is illustrated as having a plurality of sides, the central opening can have any size and shape, including for example a circular contour such that it includes no planar side surfaces. As further illustrated in the embodiment of FIG. 1, the body 101 may include a coupling protrusion 120 extending from a portion of the upper surface 102. The body may further include a coupling depression (see FIG. 2), 131 on a portion of the bottom surface 103 of the bottom body 101.

The body 101 may include a ceramic, such as a material from the group of carbide, boron, nitride, oxide, or any combination thereof. In certain instances, the body 101 may consist essentially of a ceramic. In more particular instances, the body may include a carbide material, such as silicon carbide. For example, the body can consist essentially of silicon carbide. In yet another embodiment, the body may comprise alpha phase silicon carbide, more particularly, may consist essentially of alpha-phase silicon carbide. In one particular embodiment, the body 101 can comprise nitrogen-bonded silicon carbide, and more particularly may consist essentially of nitrogen-bonded silicon carbide. Some suitable examples of such materials can include, for example, N-DURANCE® or HEXOLOY®.

In another embodiment, the body 101, and more particularly, the side surface 104, may have an elliptical contour, such that it is generally arcuate in shape. It will be understood, that the embodiment of FIGS. 1-3 depicts a side surface 104 having a circular contour. However, the embodiments herein are not so strictly limited and other arcuate or elliptical shapes may be utilized.

The bodies of the embodiments herein may be completely solid, except for those openings and apertures intentionally included in the body. That is, the body 101 can have a theoretical density of greater than 50% or greater than 75% or greater than 90% or greater than 95%. In still other instances, the body 101 may include one or more voids contained in the body 101. Such voids may be the result of select forming processes, such as, but not limited to drain casting.

In certain embodiments, the central opening 110 may intersect the upper surface 102 and coupling protrusion 120, thus creating portions of such elements. For example, as illustrated in FIGS. 1 and 2, the upper surface 102 can include a first upper surface portion 121 and a second upper surface portion 122 separated by the central opening 110. Furthermore, based on the position of the central opening 110, the coupling protrusion 120 can include a first coupling protrusion portion 123 on the first upper surface portion 121 and a second coupling protrusion portion 124 on the second upper surface portion 122. As illustrated, the central opening 110 may separate the first coupling protrusion portion 123 from the second coupling protrusion portion 124.

In accordance with an embodiment, the coupling protrusion 120 can have a tapered shape as viewed in cross-section. For example, referring to FIGS. 2 and 3, the first coupling protrusion portion 123 may have a sidewall 141 extending generally vertically along the body's vertical axis 183. Still, the sidewall may not be perfectly parallel to the vertical axis 183, such that the sidewall 141 is angled relative to the vertical axis 183 to create a tapered cross-sectional shape. Such a shape may facilitate suitable coupling of the first coupling protrusion portion 123 with another refractory body, such as a coupling depression of another refractory body. The second coupling protrusion portions 124 may also have a sidewall 142 that can be angled relative to the vertical axis 183 and may define a tapered cross-sectional shape.

In one embodiment, the coupling depression 131 can extend into a portion of the bottom surface 103 and define a cavity. The coupling depression 131 may have a taper angle 132 that can facilitate improved formation and use of the refractory article. In one embodiment, the taper angle 132 of the coupling depression 131 can be greater than 90°, such as greater than 91° or greater than 92° or greater than 95° or greater than 98° or greater than 100° or greater than 105°. Still, in one particular embodiment, the taper angle 132 may be not greater than 160°, such as not greater than 150° or not greater than 140° or not greater than 130° or not greater than 120° or not greater than 110° or not greater than 100°. It will be appreciated that the taper angle 132 can have a value within a range including any of the minimum and maximum values noted above.

In another embodiment, the coupling depression 131 may have a depth 133 and the coupling protrusion 120 may have a height 144. The relative depth 133 of the coupling depression 131 to the height 144 of the coupling protrusion 120 (or any of its portions 123, 124) may be controlled to facilitate improved operation of the refractory article. For example, the depth 133 of the coupling depression 131 may be not greater than 200% of the height 144, such as not greater than 180% or not greater than 150% or not greater than 120% or not greater than 100% of the height 144. Still, in at least one embodiment, the depth 133 of the coupling depression 131 can be at least 50% of the height 144, such as greater than 80% or greater than 90% or greater than 100% or greater than 110% or greater than 120%. It will be appreciated that the relative depth 133 of the coupling depression 131 to the height 144 of the coupling protrusion 120 can be within a range including any of the minimum and maximum percentages noted above.

In accordance with one embodiment, the height 144 can be within a range of at least 1 mm and not greater than 50 mm or within a range of at least 2 mm and not greater than 25 mm or within a range including at least 3 mm and not greater than 12 mm or even within range including at least 5 mm and not greater than 10 mm.

In another embodiment, the depth 133 can be within range of at least 1 mm and not greater than 100 mm, such as within a range of at least 2 mm and not greater than 80 mm or within range of at least 2 mm and not greater than 50 mm or within range of at least 3 mm and not greater than 25 mm or within a range of at least 5 mm and not greater than 10 mm.

Another embodiment, the coupling depression 131 can have a width 134 and the coupling protrusion 120 may have a width 145 and the body 101 may be formed to have a particular relationship of the width 134 to the width 145 that may facilitate improved use of the refractory articles. For example, the width 134 of the coupling depression 131 may be at least 2% greater than the width 145 of the coupling protrusion 120. In other embodiments, the relative width 134 to the width 145 may be greater, such that the width 134 is at least 5% greater than the width 145, such as at least 10% greater or at least 15% greater at least 20% greater. Still, in another non-limiting embodiment, the width 134 of the coupling depression 131 can be no more than 90% greater than the width 145 of the coupling protrusion 120, such as less than 80% greater or less than 50% greater or less than 30% greater or less than 15% greater than the width 145. It will be appreciated that the width 134 of the coupling depression 131 relative to the width 145 of the coupling protrusion 120 may be within range including any of the minimum and maximum values noted above.

In another embodiment, the coupling depression 131 may have a width of at least 2 cm, such as least 5 cm, or at least 8 cm for at least 15 cm, the coupling depression 131 may have a width 134 of not greater than 200 cm, such as not greater than 100 cm, or not greater than 50 cm. It will be appreciated that the width 134 of the coupling depression 131 may be within a range, including any of the minimum and maximum values noted above.

Moreover, the coupling protrusion 120 may have a width 145 of at least 1 cm, such as at least 2 cm, or at least 3 cm or at least 5 cm. Still, the coupling protrusion 120 may have a width 145 that is not greater than 150 cm or not greater than 90 cm or not greater than 40 cm. It will be appreciated that the coupling protrusion 120 can have a width 145 within a range including any of the minimum and maximum values noted above.

As further illustrated in the embodiment of FIG. 1-3, the coupling depression 131 made be in the form of a cavity. More particularly, the coupling depression 131 may be a blind hole. For example, the coupling depression 131 may have a sidewall 136 and an upper surface 138, wherein at least a portion of the sidewall 136 has a same or similar contour as a portion of the coupling protrusion 120. More particularly, the sidewall 136 can be tapered with respect to the upper surface 138 defining an obtuse taper angle 132, as described herein. Such angling of the sidewall 136 may facilitate improved formation as well as performance, including, relative movement of multiple refractory articles relative to each other when coupled together by the complementary mounting of the coupling protrusion into the coupling depression. In one embodiment, the relative size and shape of the coupling depression to the coupling protrusion may facilitate independent rotation and relative movement of one refractory article relative to another while maintaining contact with each other, thus facilitating efficient assembly of complicated structures, particularly racks of kiln furniture, reducing downtime and improving productivity.

In accordance with an embodiment, the central opening 110 can be defined by the first inner side surface 125, the second inner side surface 126 and a receiving surface 127 extending between the first inner side surface 125 in the second inner side surface 126. In one particular embodiment, at least a portion of the receiving surface 127 can have a non-planar contour in at least one direction. For example, the receiving surface 127 can have a convex curvature. Referring in particular to FIG. 3, the receiving surface 127 is illustrated as having a curved surface such that a portion of the receiving surface is bowed upwards. Without wishing to be tied to a particular theory, it is theorized that the such a surface contour facilitates limited contact between the refractory article and an object contained in the central opening 110, such that during processing, including heating and cooling, the objects may shift relative to each other without damaging the components or creating unnecessary strain on the bodies, which may lead to failure. In particular, the receiving surface 127 may have a curvature extending along a longitudinal direction as defined by longitudinal axis 181.

In accordance with an embodiment, the receiving surface 127 may have a radius of curvature of at least 10 cm, such as at least 25 cm or at least 50 cm, or at least 75 cm or at least 90 cm for at least 110 cm or at least 150 cm. Still, in another non-limiting embodiment, the receiving surface 127 may have a radius of curvature of not greater than 1000 cm, such as not greater than 800 cm or not greater than 600 cm or not greater than 400 cm or not greater than 200 cm or not greater than 150 cm. It will be appreciated that the radius of curvature of the receiving surface 127 can be within a range including any of the minimum and maximum values noted above.

In another embodiment, the entire receiving surface 127 can have a convex curvature in a longitudinal direction of the central opening 110. As illustrated in FIG. 3, the entire receiving surface 127 can be curved, defining a convex curvature (i.e., bowed upwards). It will be appreciated that the receiving surface 127 may have other non-planar contours that can facilitate limited contact with an object, including for example, but not limited to, undulations, raised islands, a patterned surface, grooves and ridges, and the like.

In certain instances, the receiving surface 127 may be substantially planar in another direction, such as the lateral direction as defined by the lateral axis 180 (see, FIG. 2). In such embodiments, the receiving surface 127 can be non-planar as viewed in one direction and substantially planar as viewed in another direction. While not illustrated in the embodiments of FIG. 2, it will be appreciated that the receiving surface 127 may also be curved in the lateral direction as defined by the lateral axis 180. For example, at least a portion of the receiving surface 127 may have a convex curvature along the lateral direction of the central opening 110. More particularly, in one embodiment, the entire receiving surface in the lateral direction may have a convex curvature.

The central opening 110 can have a first entry angle 151 defined as the angle between the first inner side surface 125 and the receiving surface 127. In at least one embodiment, the first entry angle 151 can be greater than 90°, such as at least 93°, or at least 95°, or at least 98° or at least 100°. Still, in another non-limiting embodiment, the first entry angle 151 may be not greater than 160°, such as not greater than 140° or not greater than 120° or not greater than 110° or not greater than 100°. It will be appreciated that the first entry angle 151 can be within a range, including any of the minimum and maximum values noted above.

The central opening 110 can have a second entry angle 152 defined as the angle between the second inner side surface 126 and the receiving surface 127. In at least one embodiment, the second entry angle 152 can be greater than 90°, such as at least 93°, or at least 95°, or at least 98° or at least 100°. Still, in another non-limiting embodiment, the second entry angle 152 may be not greater than 160°, such as not greater than 140° or not greater than 120° or not greater than 110° or not greater than 100°. It will be appreciated that the second entry angle 152 can be within a range, including any of the minimum and maximum values noted above.

As further illustrated in FIGS. 1-3, the central opening 110 may extend through the majority of the body. For example, the central opening 110 may extend for a majority of a diameter of the body 101, wherein the diameter may be defined by the distance along the longitudinal axis 181 between points opposite each other on the side surface 104. In a more particular embodiment, such as those illustrated in FIGS. 1-3, the central opening 110 may extend for the entire diameter of the body 101 and intersects the side surfaces at two different positions on opposite sides of the body 101. In such instances, the central opening 110 defines an aperture or opening extending entirely through the body 101.

Figure 4:
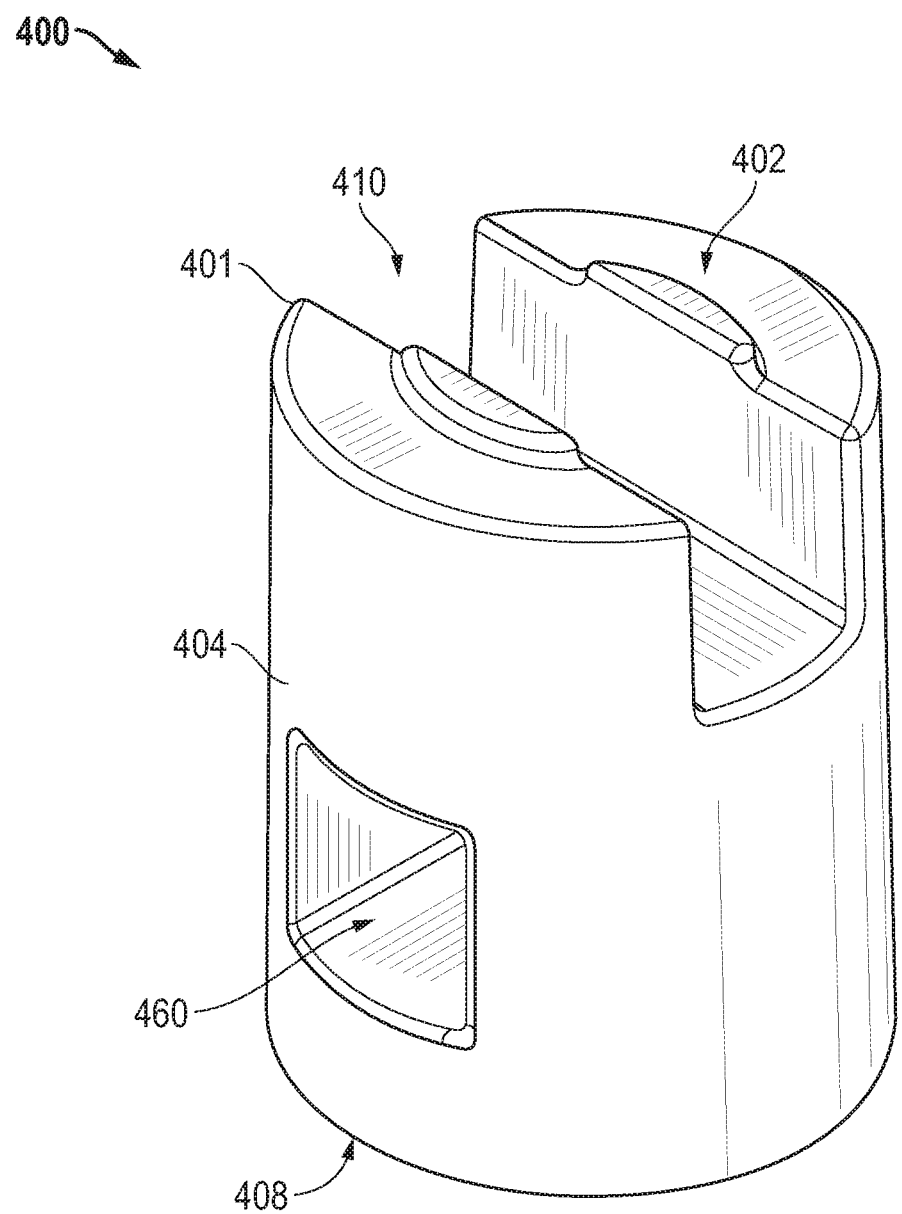
FIG. 4 includes a perspective view illustration of a refractory article in accordance with an embodiment.
Figure 5:
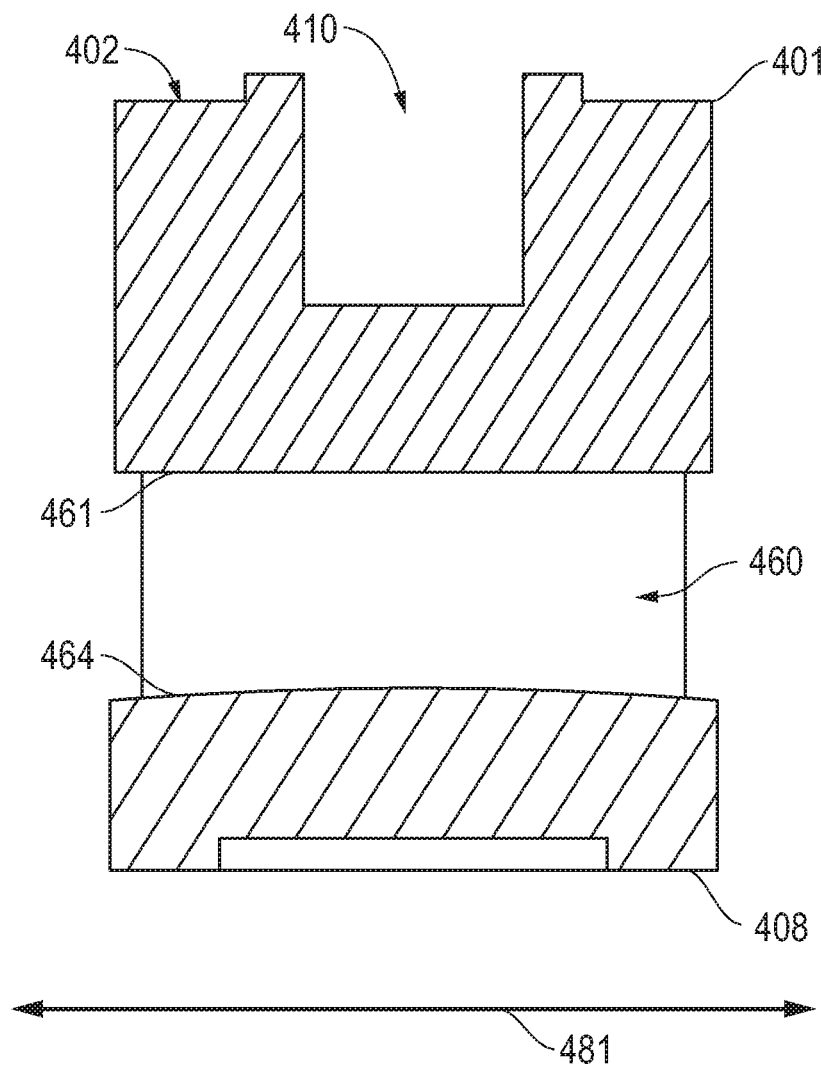
FIG. 5 includes a cross-sectional illustration of a portion of a refractory article in accordance with an embodiment.
Figure 6:
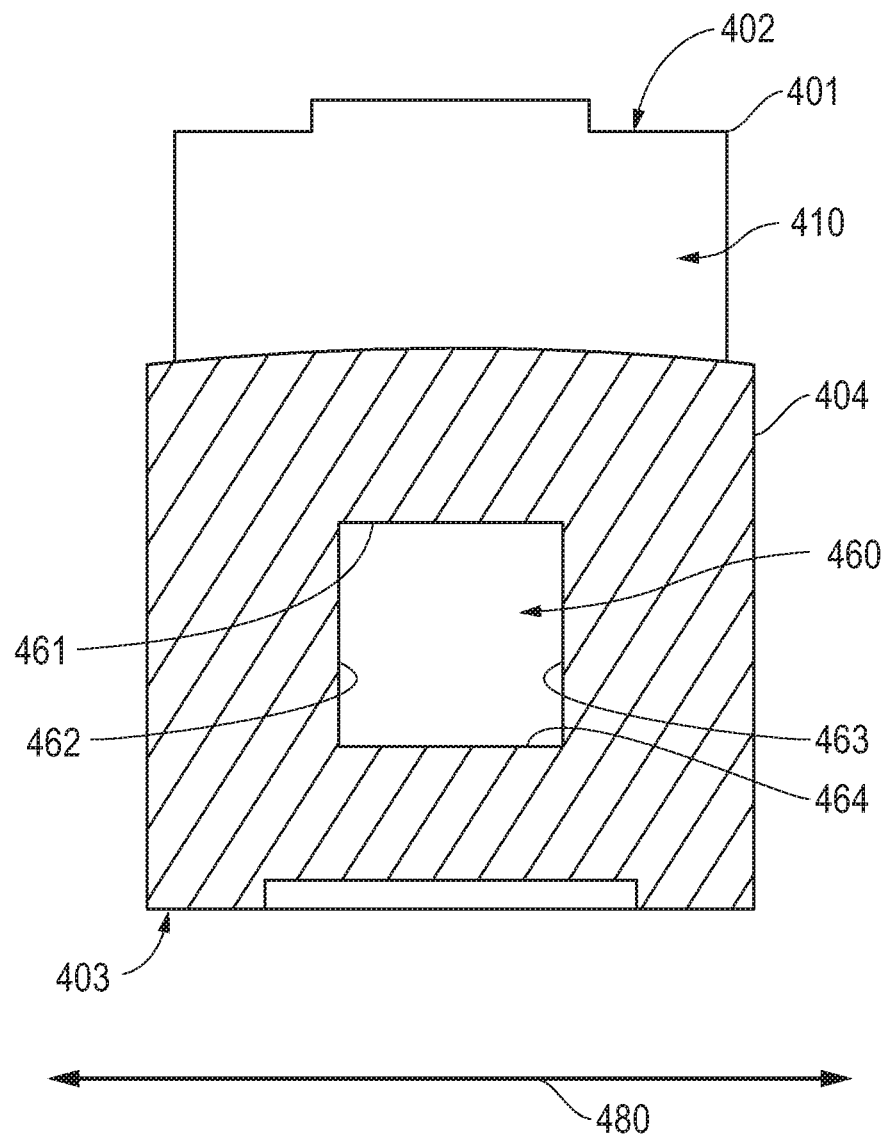
FIG. 6 includes a cross-sectional view illustration of a portion of a refractory article in accordance with an embodiment.

FIGS. 4, 5 and 6 include illustrations of a refractory article according to another embodiment. The body 401 may include an upper surface 402, a bottom surface 403, and a side surface 404 extending between the upper surface 402 and bottom surface 403. As illustrated in FIGS. 4-6, the refractory article 400 can have some of the same features as refractory article 100 illustrated in FIGS. 1-3. More particularly, the body 401 may include a secondary opening 460, spaced apart from the central opening 410. The secondary opening 460 may be used to contain one or more structural components therein to facilitate creation of a rack or storage structure. In one particular embodiment, the secondary opening 460 can be disposed between the bottom surface 403 and the central opening 410. In still another embodiment, the secondary opening 460 can be a blind hole having a terminating surface within the body (not illustrated). Still, it will be appreciated that the secondary opening 460 may define an aperture extending through the entire body 401 and intersecting the side surface 404 at two locations opposite each other.

In accordance with an embodiment, the secondary opening 460 may include an upper surface 461, a first side surface 462, a second side surface 463, and a receiving surface 464 defining the size and shape of the secondary opening 460. In particular instances, the secondary opening 460 may have a curvature, and more particularly, one or more surfaces defining the secondary opening 460 (e.g., upper surface 461, a first side surface 462, a second side surface 463, and a receiving surface 464) may have a curvature. In accordance with one embodiment, the receiving surface 464 of the secondary opening 460 may have a convex curvature. The convex curvature may extend entirely in the longitudinal direction 481. Moreover, the receiving surface 464 may have a convex curvature extending in a lateral direction 480 along the lateral axis 480. Still, in an alternative embodiment, such as illustrated in FIG. 6, the receiving surface 464 may be substantially planar in the lateral direction as defined by the lateral axis 480. It will be appreciated that while the secondary opening 460 is illustrated as having a quadrilateral cross-sectional shape. Any suitable size and shape may be used depending upon the intended application.

The secondary opening 460 is depicted as extending in a direction that is perpendicular to the direction of the central opening 410, defining a 90 degree offset. Other embodiments can have any degree of offset between 0 degrees and 359 degrees. That is, the central opening 410 and the secondary opening 460 may extend in the same direction through the body as compared to each other. Still, in other instances, the central opening 410 and the secondary opening 460 may extend in any variation of different directions through the body as compared to each other.

The refractory bodies of any of the embodiments herein can comprise certain contents of other materials, such as oxides from the group of alumina, silica, zirconia, spinel, or any combination thereof. These materials can be combined in any relative combination.

In particular embodiments, the refractory body can comprise a material having a porosity of no greater than about 60 vol % for a total volume of the body. In yet other instances, the porosity can be no greater than about 50 vol % or not greater than 30 vol % or not greater than 15 vol % or not greater than 10 vol % or not greater than about 5 vol % or not greater than about 4 vol % or not greater than about 3 vol % or not greater than about 2 vol % or even not greater than about 1 vol. In one particular embodiment, the body can be essentially free of porosity.

In further embodiments, the refractory body can have a Modulus of Elasticity (MOE) at 20° C. of no less than about 5 gigapascals (GPa), as measured according to ASTM C885-87. In still another embodiment, the MOE may be no less than about 20 GPa, no less than about 50 GPa, no less than about 75 GPa, no less than about 90 GPa, no less than about 100 GPa, no less than about 110 GPa, no less than about 120 GPa, no less than about 130 GPa, no less than about 140 GPa, no less than about 150 GPa, no less than about 175 GPa, no less than about 200 GPa, no less than about 250 GPa, no less than about 300 GPa, or even no less than about 350 GPa. In another embodiment, the refractory body may have a Modulus of Elasticity at 20° C. of no greater than about 500 GPa, such as no greater than about 450 GPa, or even no greater than about 400 GPa. The Modulus of Elasticity at 20° C. can be within a range between and including any of the values described above, such as, for example, between at least 150 GPa and no greater than 300 GPa.

In yet further embodiments, the refractory body can have a Modulus of Rupture (MOR) at 1250° C. of no less than about 1.5 megapascals (MPa), as measured according to ASTM C133. In still another embodiment, the MOR can be no less than about 10 MPa, no less than about 25 MPa, no less than about 50 MPa, no less than about 75 MPa, no less than about 100 MPa, no less than about 150 MPa, no less than about 200 MPa, no less than about 250 MPa, no less than about 300 MPa, or even no less than about 350 MPa. In at least one non-limiting embodiment, the refractory body can have a Modulus of Rupture at 1250° C. of no greater than about 500 MPa, such as no greater than about 450 MPa, or even no greater than about 400 MPa. It will be appreciated that the Modulus of Rupture at 1250 C can be within a range including any of the values described above, such as, for example, between at least 90 MPa and not greater than 320 MPa.

In another aspect, the refractory body can have a particular coefficient of thermal expansion (CTE), such as a CTE of no greater than about $9.0 \times 10^{-6}$ mm/mm·° $C.^{-1}$, as measured according to ASTM C832. In still another embodiment, the CTE may be no greater than about $8.5 \times 10^{-6}$ mm/mm·° $C.^{-1}$, such as no greater than about $8.0 \times 10^{-6}$ mm/mm·° $C.^{-1}$, no greater than about $7.5 \times 10^{-6}$ mm/mm·° $C.^{-1}$, no greater than about $7.0 \times 10^{-6}$ mm/mm·° $C.^{-1}$, no greater than about $6.5 \times 10^{-6}$ mm/mm·° $C.^{-1}$, no greater than about $6.0 \times 10^{-6}$ mm/mm·° $C.^{-1}$, no greater than about $5.5 \times 10^{-6}$ mm/mm·° $C.^{-1}$, no greater than about $5.0 \times 10^{-6}$ mm/mm·° $C.^{-1}$, or even no greater than about $4.5 \times 10^{-6}$ mm/mm·° $C.^{-1}$. In an alternative embodiment, the refractory body can have a CTE of no less than about $1.0 \times 10^{-6}$ mm/mm·° $C.^{-1}$, such as no less than about $2.0 \times 10^{-6}$ mm/mm·° $C.^{-1}$, no less than about $3.0 \times 10^{-6}$ mm/mm·° $C.^{-1}$, no less than about $3.5 \times 10^{-6}$ mm/mm·° $C.^{-1}$, or even no less than about $4.0 \times 10^{-6}$ mm/mm·° $C.^{-1}$. It will be appreciated that the CTE can be within a range including any of the values described above, such as, for example, at least $4.0 \times 10^{-6}$ mm/mm·° $C.^{-1}$ and not greater than $4.8 \times 10^{-6}$ mm/mm·° $C.^{-1}$.

In particular embodiments, the refractory body may have a particular thermal conductivity at 1200° C., such as no less than about 0.5 W/mK, as measured according to ASTM C1113, such as no less than about 5 W/mK, no less than about 10 W/mK, no less than about 15 W/mK, no less than about 20 W/mK, no less than about 25 W/mK, no less than about 30 W/mK, or even no less than about 40 W/mK. In another embodiment, the thermal conductivity at 1200° C. may be no greater than about 100 W/mK, such as no greater than about 90 W/mK, no greater than about 80 W/mK, no greater than about 70 W/mK, no greater than about 60 W/mK, or even no greater than about 50 W/mK. It will be appreciated that the thermal conductivity at 1200 C can be within a range including any of the values described above, such as, for example, at least 30 W/mK and not greater than 41 W/mK.

In yet other embodiments, the refractory body can have a maximum usable temperature, as defined by the maximum operating temperature (i.e., the body will not melt and remains operable), of no less than about 1100° C., such as no less than about 1200° C., no less than about 1300° C., no less than about 1400° C., no less than about 1500° C., no less than about 1600° C., no less than about 1700° C., no less than about 1800° C., no less than about 1900° C., no less than about 2000° C. The refractory body may have a maximum usable temperature within a range of at least 1750° C. and not greater than 2100° C.

Figure 7:
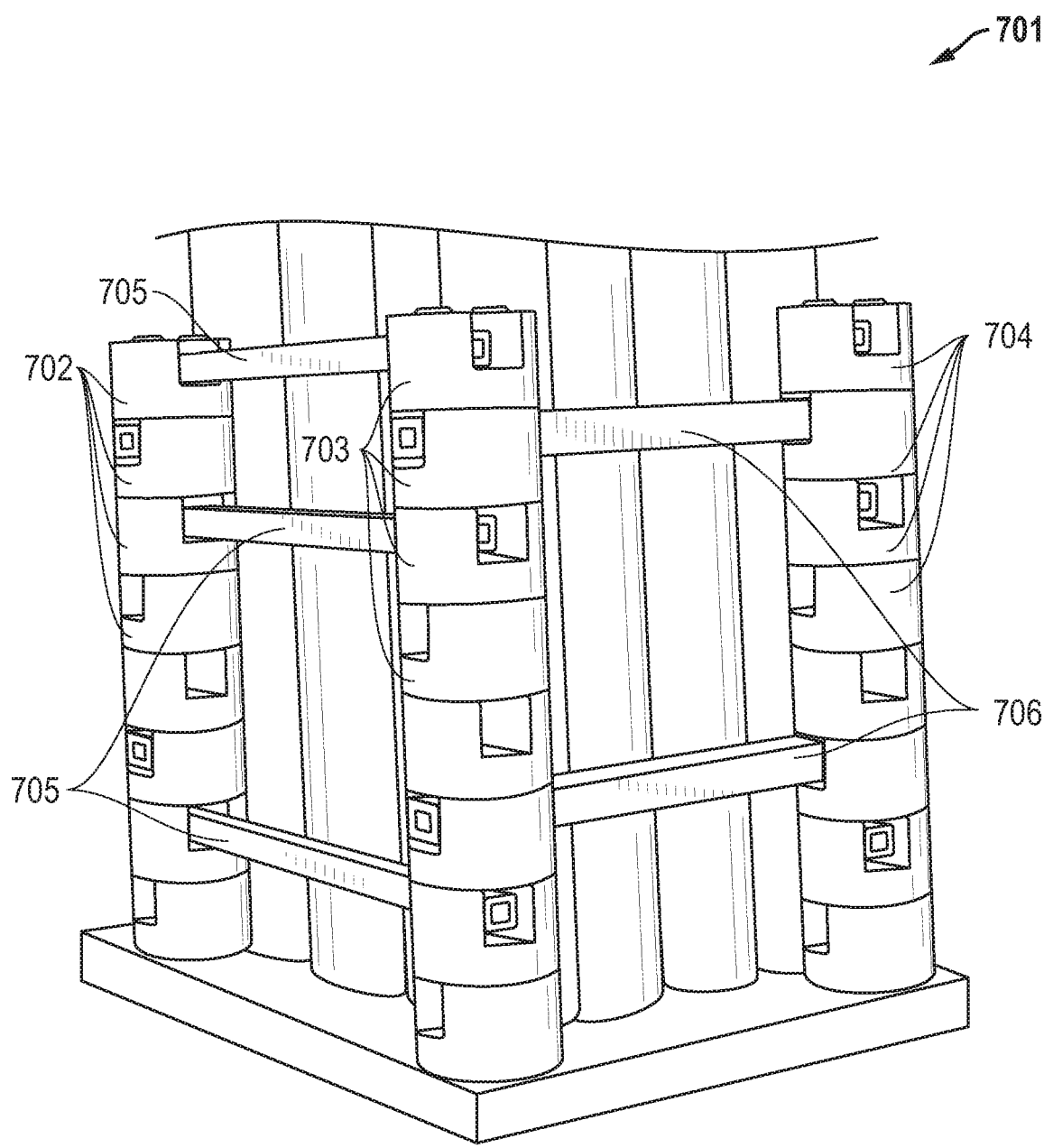
FIG. 7 includes a perspective view illustration of a system utilizing a plurality of refractory articles in accordance with an embodiment.

FIG. 7 includes a perspective view illustration of a system utilizing a plurality of refractory articles in accordance with an embodiment. The system 701 includes a plurality of refractory articles 702, 703 and 704, separated and joined by beams 705 and 706. The beams 705 and 706 can extend between and coupled to the refractory articles 702, 703, and 704. Such a system 701 has enhanced stability and versatility as compared to other state-of-the-art systems. Certain combination of features of the embodiments herein allow for adjustments to the system while building the system, specifically relative rotation between adjacent refractory articles while engaged with one or more beams allowing the builder to make adjustments to the orientation of the refractory bodies ensuring a stable structure.

In certain embodiments, the refractory body may have a coating or surface treatment that may enhance its physical and/or chemical properties. In particular embodiments, the body can be treated using techniques, such as, for example, laser melting or ablation, mechanical sandblasting and/or chemical picking. In further embodiments, the body can be treated by galvanizing, chromate or phosphate treatments, and/or anodizing.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A refractory article comprising:
a body including:
an upper surface;
a bottom surface;
a side surface extending between the upper surface and bottom surface, wherein the side surface comprises an elliptical contour;
a central opening extending through at least a portion of the body;
a coupling protrusion extending from a portion of the upper surface; and
a coupling depression on a portion of the bottom surface.

Embodiment 2

A refractory article comprising:
a body having central opening extending through at least a portion of the body, the central opening defined by a first inner side surface, second inner side surface, and a receiving surface extending between the first inner side surface and second inner side surface, wherein at least a portion of the receiving surface comprises a convex curvature.

Embodiment 3

A refractory article comprising:
a body including:
an upper surface;
a bottom surface;
a central opening extending through at least a portion of the body;
a coupling protrusion extending from a portion of the upper surface; and
a coupling depression on a portion of the bottom surface, wherein the coupling depression defines a cavity having a taper angle greater than 90 degrees.

Embodiment 4

The refractory article of any one of embodiments 1, 2, and 3, wherein the body comprises a ceramic.

Embodiment 5

The refractory article of any one of embodiments 1, 2, and 3, wherein the body consists essentially of a ceramic.

Embodiment 6

The refractory article of any one of embodiments 1, 2, and 3, wherein the body comprises a ceramic selected from the group of a carbide, a boride, a nitride, an oxide, or any combination thereof.

Embodiment 7

The refractory article of any one of embodiments 1, 2, and 3, wherein the body comprises silicon carbide.

Embodiment 8

The refractory article of any one of embodiments 1, 2, and 3, wherein the body consists essentially of silicon carbide.

Embodiment 9

The refractory article of any one of embodiments 1, 2, and 3, wherein the body comprises alpha-phase silicon carbide.

Embodiment 10

The refractory article of any one of embodiments 1, 2, and 3, wherein the body consists essentially of alpha-phase silicon carbide.

Embodiment 11

The refractory article of embodiment 2, wherein the body includes an upper surface, a bottom surface, and a side surface extending between the upper surface and bottom surface, and further comprises a coupling protrusion extending from a portion of the upper surface, and a coupling depression on a portion of the bottom surface.

Embodiment 12

The refractory article of any one of embodiments 1, 3, and 11, wherein the side surface comprises an elliptical contour.

Embodiment 13

The refractory article of any one of embodiments 1, 3, and 11, wherein the side surface comprises a circular contour.

Embodiment 14

The refractory article of any one of embodiments 1, 3, and 11, wherein the upper surface comprises a first upper surface portion and a second upper surface portion, wherein the central opening separates the first upper portion and second upper portion.

Embodiment 15

The refractory article of embodiment 14, wherein the coupling protrusion includes a first coupling protrusion portion on the first upper surface portion and a second coupling protrusion portion on the second upper surface portion, and wherein the central opening separates the first coupling protrusion portion and the second coupling protrusion portion.

Embodiment 16

The refractory article of any one of embodiments 1, 3, and 11, wherein the coupling protrusion comprises a tapered shape as viewed in cross-section.

Embodiment 17

The refractory article of any one of embodiments 1, 3, and 11, wherein a coupling depression on a portion of the bottom surface, wherein the coupling depression defines a cavity having a taper angle greater than 90 degrees.

Embodiment 18

The refractory article of any one of embodiments 1 and 11, wherein the coupling depression defines a cavity having a taper angle greater than 90 degrees or greater than 91 degrees or greater than 92 degrees or greater than 95 degrees or greater than 98 degrees or greater than 100 degrees or greater than 105 degrees.

Embodiment 19

The refractory article of any one of embodiments 1, 3, and 11, wherein the coupling depression has a depth, and the coupling protrusion has a height, and wherein the depth is not greater than 200% of the height or not greater than 180% or not greater than 150% or not greater than 120% or not greater than 100% of the height.

Embodiment 20

The refractory article of any one of embodiments 1, 3, and 11, wherein the coupling depression has a depth, and the coupling protrusion has a height, and wherein the depth is greater than 50% of the height or greater than 80% or greater than 90% or greater than 100% or greater than 110% or greater than 120%.

Embodiment 21

The refractory article of embodiment 19, wherein the height is within a range of at least 1 mm to not greater than 50 mm.

Embodiment 22

The refractory article of embodiment 19, wherein the depth is within a range of at least 1 mm to not greater than 100 mm.

Embodiment 23

The refractory article of any one of embodiments 1, 3, and 11, wherein the coupling depression has a width, and the coupling protrusion has a width, and wherein the width of the coupling depression is at least 2% greater than the width of the coupling protrusion or at least than 5% greater or at least 10% greater or at least 15% greater or at least 20% greater.

Embodiment 24

The refractory article of embodiment 23, wherein the width of the coupling depression is not more than 90% greater than the width of the coupling protrusion or less than 80% greater or less than 50% greater or less than 30% greater or less than 15% greater than the width of the coupling protrusion.

Embodiment 25

The refractory article of embodiment 23, wherein the coupling depression comprises a width of at least 2 cm or at least 5 cm or at least 8 cm or at least 15 cm.

Embodiment 26

The refractory article of embodiment 23, wherein the coupling depression comprises a width of not greater than 200 cm or not greater than 100 cm or not greater than 50 cm.

Embodiment 27

The refractory article of embodiment 23, wherein coupling protrusion comprises a width of at least 1 cm or at least 2 cm or at least 3 cm or at least 5 cm.

Embodiment 28

The refractory article of embodiment 23, wherein the coupling protrusion comprises a width of not greater than 150 cm or not greater than 90 cm or not greater than 40 cm.

Embodiment 29

The refractory article of any one of embodiments 1, 3, and 11, wherein the coupling depression is a cavity.

Embodiment 30

The refractory article of any one of embodiments 1, 3, and 11, wherein the coupling depression is a blind hole.

Embodiment 31

The refractory article of any one of embodiments 1, 3, and 11, wherein the coupling depression comprises a side wall and an upper surface, and wherein at least a portion of the side wall has a same contour as a portion of the coupling protrusion.

Embodiment 32

The refractory article of any one of embodiments 1 and 3, wherein the central opening is defined by a first inner side surface, second inner side surface, and a receiving surface extending between the first inner side surface and second inner side surface, wherein at least a portion of the receiving surface comprises a convex curvature.

Embodiment 33

The refractory article of any one of embodiments 2 and 32, wherein the receiving surface has a radius of curvature of at least 10 cm along a longitudinal direction of the central opening.

Embodiment 34

The refractory article of any one of embodiments 2 and 32, wherein the entire receiving surface comprises a convex curvature along a longitudinal direction of the central opening.

Embodiment 35

The refractory article of any one of embodiments 2 and 32, wherein at least a portion of the receiving surface comprises a convex curvature along a lateral direction of the central opening.

Embodiment 36

The refractory article of any one of embodiments 2 and 32, wherein the entire receiving surface comprises a convex curvature along a lateral direction of the central opening.

Embodiment 37

The refractory article of any one of embodiments 2 and 32, wherein the receiving surface is substantially planar along a lateral direction of the central opening.

Embodiment 38

The refractory article of any one of embodiments 2 and 32, wherein the central opening defines a first entry angle between a first inner side surface and the receiving surface, wherein the first entry angle is greater than 90 degrees.

Embodiment 39

The refractory article of any one of embodiments 2 and 32, wherein the central opening defines a second entry angle between a second inner side surface and the receiving surface, wherein the second entry angle is greater than 90 degrees.

Embodiment 40

The refractory article of any one of embodiments 1, 2, and 3, wherein the central opening extends for a majority of a diameter of the body.

Embodiment 41

The refractory article of any one of embodiments 1, 2, and 3, wherein the central opening extends for the entire diameter of the body and intersects the side surface at two different positions.

Embodiment 42

The refractory article of any one of embodiments 1, 2, and 3, wherein the body further comprises a secondary opening spaced apart from the central opening.

Embodiment 43

The refractory article of embodiment 42, wherein the secondary opening is disposed between the bottom surface and the central opening.

Embodiment 44

The refractory article of embodiment 42, wherein the secondary opening is a blind hole having a terminating surface within the body.

Embodiment 45

The refractory article of embodiment 42, wherein the secondary opening extends through the entire body and defines an aperture.

Embodiment 46

A high temperature storage system comprising:
a first refractory article comprising a first body including:
an upper surface;
a bottom surface;
a coupling protrusion extending from a portion of the upper surface;
a coupling depression on a portion of the bottom surface; and
a second refractory article comprising a second body including:
an upper surface;
a bottom surface;
a coupling protrusion extending from a portion of the upper surface;
a coupling depression on a portion of the bottom surface; and
wherein the coupling protrusion of the first body is disposed within the coupling depression of the second body, and the first body and second body are configured to rotate relative to each other while engaged.

Embodiment 47

The high temperature storage system of embodiment 46, wherein the first refractory system has any feature or combination of features of embodiments 1-41.

Embodiment 48

The high temperature storage system of embodiment 46, wherein the second refractory system has any feature or combination of features of embodiments 1-41.

Embodiment 49

The high temperature storage system of embodiment 46, wherein the first body and second body are configured to rotate relative to each other while engaged and further while having at least one refractory object contained in a central opening of the first body.

The embodiments provide a combination of features, which can be combined in various matters to describe and define a method and system of the embodiments. The description is not intended to set forth a hierarchy of features, but different features that can be combined in one or more manners to define the invention. In the foregoing, reference to specific embodiments and the connection of certain components is illustrative. It will be appreciated that reference to components as being coupled or connected is intended to disclose either direct connected between said components or indirect connection through one or more intervening components as will be appreciated to carry out the methods as discussed herein.

As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The disclosure is submitted with the understanding that it will not be used to interpret or limit the scope or meaning of the claims. In addition, in the foregoing disclosure, various features may be grouped together or described in a single embodiment for the purpose of streamlining the disclosure. This disclosure is not to be interpreted as reflecting an intention that the embodiments herein limit the features provided in the claims, and moreover, any of the features described herein can be combined together to describe the inventive subject matter. Still, inventive subject matter may be directed to less than all features of any of the disclosed embodiments.

What is claimed is:

1. A refractory article comprising:
   a body including:
      an upper surface;
      a bottom surface;
      an outer side surface extending between the upper surface and bottom surface, wherein the outer side surface comprises an elliptical contour;
      a central opening extending through at least a portion of the body, wherein the central opening intersects the outer side surface;
      a coupling protrusion extending from a portion of the upper surface; and
      a coupling depression on a portion of the bottom surface.

2. The refractory article of claim 1, wherein the body comprises a ceramic including a carbide, a boride, a nitride, an oxide, or any combination thereof.

3. The refractory article of claim 1, wherein the body comprises silicon carbide.

4. The refractory article of claim 1, wherein the central opening intersects the upper surface, thus creating a first upper surface portion and a second upper surface portion, wherein the first upper surface portion is completely separated from the second upper surface portion by the central opening.

5. A refractory article comprising:
   a body including:
      an upper surface;
      a bottom surface;
      a side surface extending between the upper surface and bottom surface, wherein the side surface comprises an elliptical contour;
      a central opening extending through at least a portion of the body;
      a coupling protrusion extending from a portion of the upper surface, wherein the central opening intersects the upper surface and the coupling protrusion, thus creating a first coupling protrusion portion and a second coupling protrusion portion, wherein the second coupling protrusion portion is completely separated from the first coupling protrusion portion by the central opening; and
      a coupling depression on a portion of the bottom surface.

6. The refractory article of claim 5, wherein the coupling protrusion comprises a tapered shape as viewed in cross-section.

7. The refractory article of claim 1, wherein the coupling depression defines a cavity having a taper angle greater than 90 degrees.

8. A high temperature storage system, comprising a plurality of the refractory articles of claim 1 including a first refractory article and a second refractory article, wherein the coupling protrusion of the first refractory article is disposed within the coupling depression of the second refractory article, and the body of the first refractory article and the body of the second refractory article are configured to rotate relative to each other while engaged.

9. The refractory article of claim 1, wherein the central opening is defined by a first inner side surface, second inner side surface, and a receiving surface extending between the first inner side surface and second inner side surface, wherein at least a portion of the receiving surface comprises a convex curvature.

10. The refractory article of claim 5, wherein the central opening intersects the side surface and separates the side surface into a first side surface portion and a second side surface portion.

11. The refractory article of claim 9, wherein the coupling depression has a depth, and the coupling protrusion has a height, and wherein the depth is greater than 50% of the height and not greater than 200% of the height.

12. The refractory article of claim 11, wherein the height is within a range of at least 1 mm to not greater than 50 mm, and wherein the depth is within a range of at least 1 mm to not greater than 100 mm.

13. The refractory article of claim 9, wherein the coupling depression has a width, and the coupling protrusion has a width, and wherein the width of the coupling depression is at least 2% greater than the width of the coupling protrusion and not more than 90% greater than the width of the coupling protrusion.

14. The refractory article of claim 13, wherein the coupling depression comprises a width of at least 2 cm and not greater than 200 cm, and wherein the coupling protrusion comprises a width of at least 1 cm and not greater than 150 cm.

15. The refractory article of claim 5, wherein the coupling depression defines a cavity having a taper angle greater than 90 degrees.

16. The refractory article of claim 5, wherein the central opening is defined by a first inner side surface, second inner side surface, and a receiving surface extending between the first inner side surface and second inner side surface, wherein at least a portion of the receiving surface comprises a convex curvature.

17. The refractory article of claim 1, wherein the body further comprises a secondary opening spaced apart from the central opening and disposed between the bottom surface and the central opening.

18. The refractory article of claim 5, wherein the body comprises alpha-phase silicon carbide.

\* \* \* \* \*